United States Patent
Ono et al.

(10) Patent No.: US 7,675,832 B2
(45) Date of Patent: Mar. 9, 2010

(54) OPTICAL ELEMENT FEEDING DEVICE DRIVING METHOD AND OPTICAL DISK APPARATUS

(75) Inventors: Seiji Ono, Yokosuka (JP); Naomitsu Kuroda, Yokohama (JP); Eiji Okubo, Yokohama (JP); Yasushi Horie, Tokyo (JP)

(73) Assignees: Hitachi Media Electronics Co., Ltd., Iwate (JP); Nidec Copal Corporation, Tokyo (JP)

( * ) Notice: Subject to any disclaimer, the term of this patent is extended or adjusted under 35 U.S.C. 154(b) by 550 days.

(21) Appl. No.: 11/679,969

(22) Filed: Feb. 28, 2007

(65) Prior Publication Data

US 2007/0206460 A1     Sep. 6, 2007

(30) Foreign Application Priority Data

Mar. 1, 2006     (JP)     ............... 2006-055305

(51) Int. Cl.
G11B 7/00     (2006.01)
(52) U.S. Cl. ............... 369/112.01; 369/44.24
(58) Field of Classification Search ............. 369/44.23, 369/44.24, 112.01, 112.02, 112.1, 44.14
See application file for complete search history.

(56) References Cited

U.S. PATENT DOCUMENTS

2007/0253068 A1* 11/2007 Yasuda et al. ............... 359/618

FOREIGN PATENT DOCUMENTS

| JP | 05-081881 | 4/1993 |
|----|-----------|--------|
| JP | 07-174955 | 7/1995 |
| JP | 10-074369 | 3/1998 |
| JP | 2000-030381 | 1/2000 |
| JP | 2002-131610 | 5/2002 |
| JP | 2004-151300 | 5/2004 |
| JP | 2005-084545 | 3/2005 |

* cited by examiner

*Primary Examiner*—Nabil Z Hindi
(74) *Attorney, Agent, or Firm*—Antonelli, Terry, Stout & Kraus, LLP.

(57) ABSTRACT

An optical element feeding device driving method and an optical disk apparatus capable of detecting biting in a stepping motor and conducting restoration. The optical disk apparatus includes an optical element feeding device including a movable frame for supporting a spherical aberration correcting lens to move the lens in optical axis direction, a spring for applying force to the frame in the direction, a sensor for detecting a lens reference position, a stepping motor, and a lead screw and a nut for converting motor rotation into the direction, a motor driving circuit, a decision circuit for judging abnormality when an output of the sensor does not change even if the driving circuit outputs a driving signal to the motor after reference position detection, and a changeover circuit for lowering a driving frequency than in ordinary operation, based on an abnormality signal.

8 Claims, 6 Drawing Sheets

OPTICAL ELEMENT FEEDING DEVICE DRIVING METHOD AND OPTICAL DISK APPARATUS

INCORPORATION BY REFERENCE

The present application claims priority from Japanese application JP2006-055305 filed on Mar. 1, 2006, the content of which is hereby incorporated by reference into this application.

BACKGROUND OF THE INVENTION

The present invention relates to a driving method for a lens (optical element) feeding device used to correct aberration of an optical pick device, and relates to the optical disk (disc) apparatus.

An optical disk recording/reproducing device is an optical information recording/reproducing device having non-contact, a large capacity, fast access and a low cost as features. Making the most of these features, the optical disk recording/reproducing device is used in various fields as a digital audio signal recording/reproducing device or an external storage device for a computer. As the application fields spread, it is being promoted to heighten the performance of the optical disk recording/reproducing device. Thus, it is indispensable to improve various performances and reliability of an optical pickup device mounted on the optical disk recording/reproducing device.

For improving the recording density in the optical disk recording/reproducing device, it is effective to shorten the wavelength of the light source and increase the numerical aperture of the object lens. As one of standards for high density optical disks (discs) using a blue-violet laser having a laser wavelength near 400 nm, there are BD (Blu-ray Disc) standards which use a high NA object lens having a numerical aperture (NA) of 0.85 and an optical disk having a recording layer protection film thickness of 0.1 mm.

As for the Blu-ray Disc, a first recording layer and a second layer are disposed in one optical disk in a thickness direction of the disk with a predetermined spacing. At the time of changeover from one recording layer to the other, therefore, spherical aberration occurs. In order to correct the spherical aberration, a movable lens is provided in front of an object lens of an optical pickup device, and spherical aberration is corrected by finely adjusting the position of the movable lens with a lend feeding device.

In this lens feeding device, the movable lens is attached to a movable frame. A stepping motor is used as a motive power source. The stepping motor is rotationally driven to move the movable frame (movable lens) in an optical axis direction.

As regards the feeding device for the optical pickup device, for example, JP-A-05-081681, JP-A-10-074369 and JP-A-2000-30381 can be mentioned. As regards the lens feeding device, for example, JP-A-07-174955 can be mentioned. As a lens driving device for optical device, for example, JP-A-2004-151300 can be mentioned.

SUMMARY OF THE INVENTION

When the movable frame in the conventional lens feeding device collides with the surface of a wall located near the movable frame due to some cause during movement, biting is caused in a stepping motor which drives the movable frame due to impact force and the stepping motor cannot get away from the biting sometimes. Especially when the feeding pitch of the movable frame is small, the biting is apt to occur. If biting occurs in the stepping motor, it cannot return to normal operation and consequently it becomes impossible to use the lens feeding device, resulting in a problem in operation reliability.

Conventionally, therefore, a shock absorbing material such as sponge is stuck on the wall to weaken the impact force. However, recent lens feeding devices tend to have a further reduced feeding pitch. In many cases, therefore, the biting cannot be avoided according to the method.

An object of the present invention is to provide an optical element feeding device driving method and an optical disk apparatus capable of detecting biting in a stepping motor and conducting subsequent restoration.

In accordance with a first aspect of the present invention, there is provided an optical disk apparatus for conducting recording or reproducing on an optical disk, the optical disk apparatus including: an optical element feeding device including a support member for supporting an optical element provided to correct spherical aberration so as to be capable of moving the optical element in an optical axis direction, a force applying member for applying force to the support member in the optical axis direction, a reference position detection part for detecting a reference position of the optical element, a stepping motor supplied with a definite voltage and driven, a motive force transmission member for converting rotation of the stepping motor into the optical axis direction and transmitting the converted rotation to the optical element; a driving circuit for driving the stepping motor; a decision circuit for judging operation to be abnormal when there is no change in an output of the reference position detection part even if the driving circuit outputs a driving signal to the stepping motor after the reference position detection part has detected the reference position of the optical element; and a changeover circuit for changing over a driving frequency so as to drive the stepping motor with a driving frequency lowered than a frequency in ordinary operation, on the basis of an operation abnormality signal output from the decision circuit.

In the optical disk apparatus according to the first aspect of the present invention, wherein when the changeover circuit drives the stepping motor with a low driving frequency and the output of the reference position detection part has changed, preferably the decision circuit judges the stepping motor to have got away from the abnormal operation and the changeover circuit changes over the driving frequency of the stepping motor from the low driving frequency to the frequency in ordinary operation.

In accordance with a second aspect of the present invention, there is provided an optical disk apparatus for conducting recording or reproducing on an optical disk, the optical disk apparatus including an optical element feeding device including a support member for supporting an optical element provided to correct spherical aberration so as to be capable of moving the optical element in an optical axis direction, a reference position detection part for detecting a reference position of the optical element, a stepping motor supplied with a definite voltage and driven, and a motive force transmission member for converting rotation of the stepping motor into the optical axis direction and transmitting the converted rotation to the optical element; a driving circuit for driving the stepping motor so as to move the optical element in a definite range from the reference position detected by the reference position detection part; a decision circuit for judging operation to be abnormal when there is no change in an output of the reference position detection part even if the driving circuit outputs a driving signal to the stepping motor after the reference position detection part has detected the reference position of the optical element; and a changeover circuit for changing over a driving frequency so as to drive the stepping motor with a driving frequency lowered than a frequency in ordinary operation on the basis of an operation abnormality signal output from the operation abnormality decision circuit.

In the optical disk device according to the second aspect of the present invention, the optical element feeding device preferably further includes a force applying member for applying force to the support member in the optical axis direction. Furthermore, the driving circuit preferably changes over the driving frequency so as to make the driving frequency at driving start of the stepping motor lower than the driving frequency in ordinary operation.

In accordance with a third aspect of the present invention, there is provided an optical disk apparatus for conducting recording or reproducing on an optical disk, the optical disk apparatus including an optical element feeding device including a support member for supporting an optical element provided to correct spherical aberration so as to be capable of moving the optical element in an optical axis direction, a reference position detection part for detecting a reference position of the optical element, a stepping motor supplied with a definite voltage and driven, and a motive force transmission member for converting rotation of the stepping motor into the optical axis direction and transmitting the converted rotation to the optical element; and a driving circuit for driving the stepping motor so as to move the optical element in a definite range from the reference position detected by the reference position detection part, wherein the driving circuit changes over the driving frequency so as to make the driving frequency at driving start of the stepping motor lower than the driving frequency in ordinary operation.

In accordance with a fourth aspect of the present invention, there is provided an optical disk apparatus for conducting recording or reproducing on an optical disk, the optical disk apparatus including an optical element feeding device including a support member for supporting an optical element provided to correct spherical aberration so as to be caspable of moving the optical element in an optical axis direction, a force applying member for applying force to the support member in the optical axis direction, a reference position detection part for detecting a reference position of the optical element, a stepping motor supplied with a definite voltage and driven, a motive force transmission member for converting rotation of the stepping motor into the optical axis direction and transmitting the converted rotation to the optical element; and a driving circuit for driving the stepping motor so as to move the optical element in a definite range from the reference position detected by the reference position detection part, wherein when the optical element cannot be moved in the optical axis direction even if the stepping motor is driven with a first driving frequency, the driving circuit drives the stepping motor with a second driving frequency lower than the first driving frequency.

In accordance with a fifth aspect of the present invention, there is provided a driving method for an optical element feeding device which moves an optical element in an optical axis direction to correct spherical aberration, wherein the optical element feeding device includes a support member for supporting an optical element provided to correct spherical aberration so as to be capable of moving the optical element in an optical axis direction, a force applying member for applying force to the support member in the optical axis direction, a reference position detection part for detecting a reference position of the optical element, a stepping motor supplied with a definite voltage and driven, and a motive force transmission member for converting rotation of the stepping motor into the optical axis direction and transmitting the converted rotation to the optical element, and the driving method includes the steps of outputting a driving signal to the stepping motor, outputting an operation abnormality signal indicating operation abnormality when a reference position signal indicating a reference position detected by the reference position detection part does not change, and changing over a driving frequency on the basis so as to drive the stepping motor with a driving frequency lowered than a frequency in ordinary operation, on the basis of the operation abnormality signal.

According to the present invention, it becomes possible to detect the biting in the stepping motor and restore to the original state.

Other objects, features and advantages of the invention will become apparent from the following description of the embodiments of the invention taken in conjunction with the accompanying drawings.

DESCRIPTION OF THE EMBODIMENTS

Embodiments of the present invention will now be described with reference to the drawings.

Figure 7:
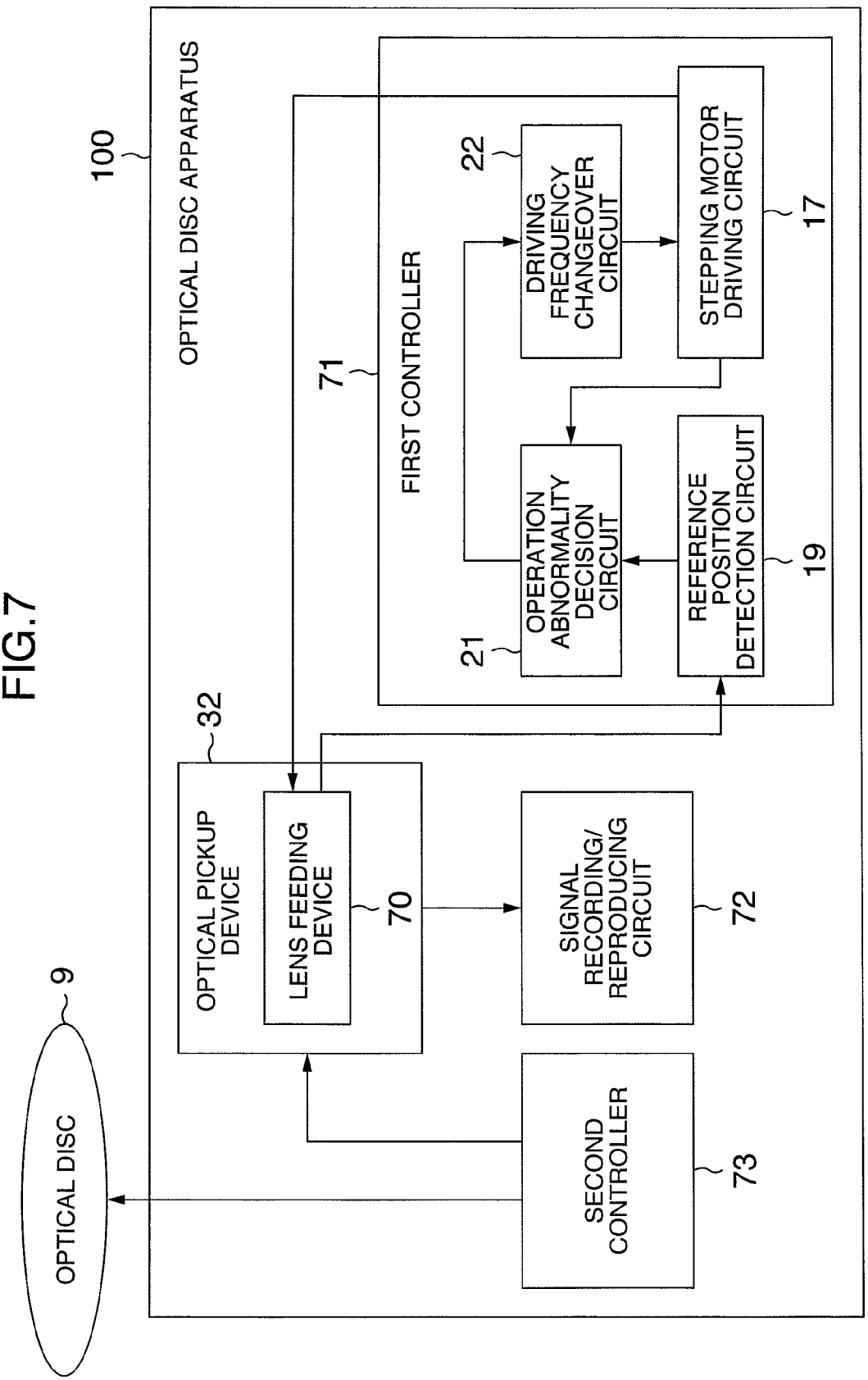
FIG. 7 is a diagram schematically showing a configuration of an optical disk apparatus according to the present invention.

FIG. 7 schematically shows a configuration of an optical disk apparatus 100 according to the present invention. The optical disk apparatus 100 includes an optical pickup device 32, a first controller 71, a signal recording/reproducing circuit 72, and a second controller 73. The first controller 71 can control a lens feeding device 70 provided in the optical pickup device 32. The first controller 71 includes a stepping motor driving circuit 17, a reference position detection circuit 19, an operation abnormality decision circuit 21, and a driving frequency changeover circuit 22. The circuits 17, 19, 21 and 22 will be described in detail later. The second controller 73 can control a spindle motor for rotating an optical disk, a feeding motor for optical pickup device, and an actuator for moving an object lens.

Figure 2:
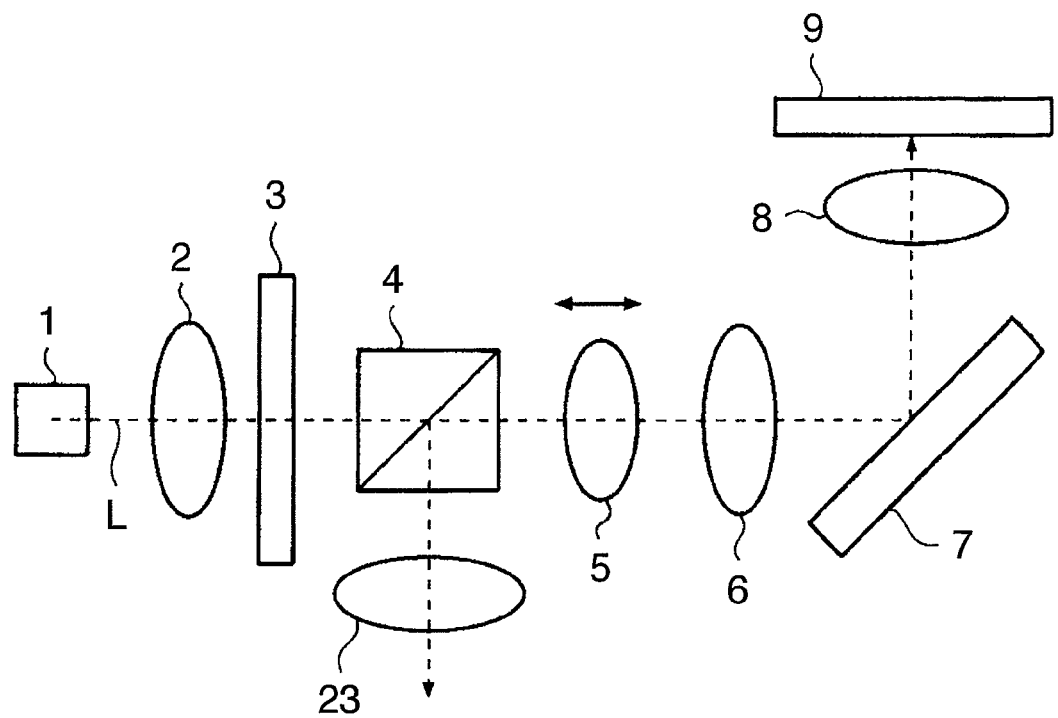
FIG. 2 is a schematic configuration diagram showing arrangement of optical elements in an optical pickup device according to an embodiment of the present invention.

FIG. 2 is a schematic configuration diagram showing arrangement of optical elements in the optical pickup device. As shown in FIG. 2, laser light L emitted from a laser diode 1 is input to a collimator lens 2, transmitted through a diffraction grating 3, and input to a polarization beam splitter 4. And the laser light L is passed through a movable lens 5, input to a fixed lens 6, changed by 90 degrees in direction by a mirror 7, passed through an object lens 8, and focused on an optical disk 9. Reference numeral 23 shown in FIG. 2 denotes a detection lens for leading the laser light L branched from the polarization beam splitter 4 to a photo-detector (not illustrated).

Some optical disks 9 have a first recording layer and a second recording layer stacked in the same disk in a thickness direction of the disk to increase the storage capacity. When accessing the first recording layer and the second recording layer in such an optical disk 9, the thickness of cover glass changes and spherical aberration occurs. For correcting the spherical aberration, therefore, it is necessary to conduct adjustment by making light entering the object lens 8 weakly-diverging ray or weakly-converging rays. The present embodiment has a configuration in which spherical aberration is corrected by moving and adjusting the movable lens 5 in an optical axis direction.

If the thickness of the cover glass of the optical disk 9 changes by 1 μm, the spherical aberration changes by 10 mλ in the Blu-ray Disc. Here, mλ (milli-lambda) is the unit of aberration, and λ is the wavelength of light in use. Since the spacing between the first recording layer and the second recording layer in the optical disk 9 is 25 μm, spherical aberration of 250 mλ occurs.

The present embodiment uses a lens which can be corrected in spherical aberration of 10 mλ if the movable lens 5 is moved by 20 μm by using the lens feeding device. For correcting the spherical aberration more accurately, it becomes necessary to make the feeding quantity of the movable lens 5 small.

Figure 1:
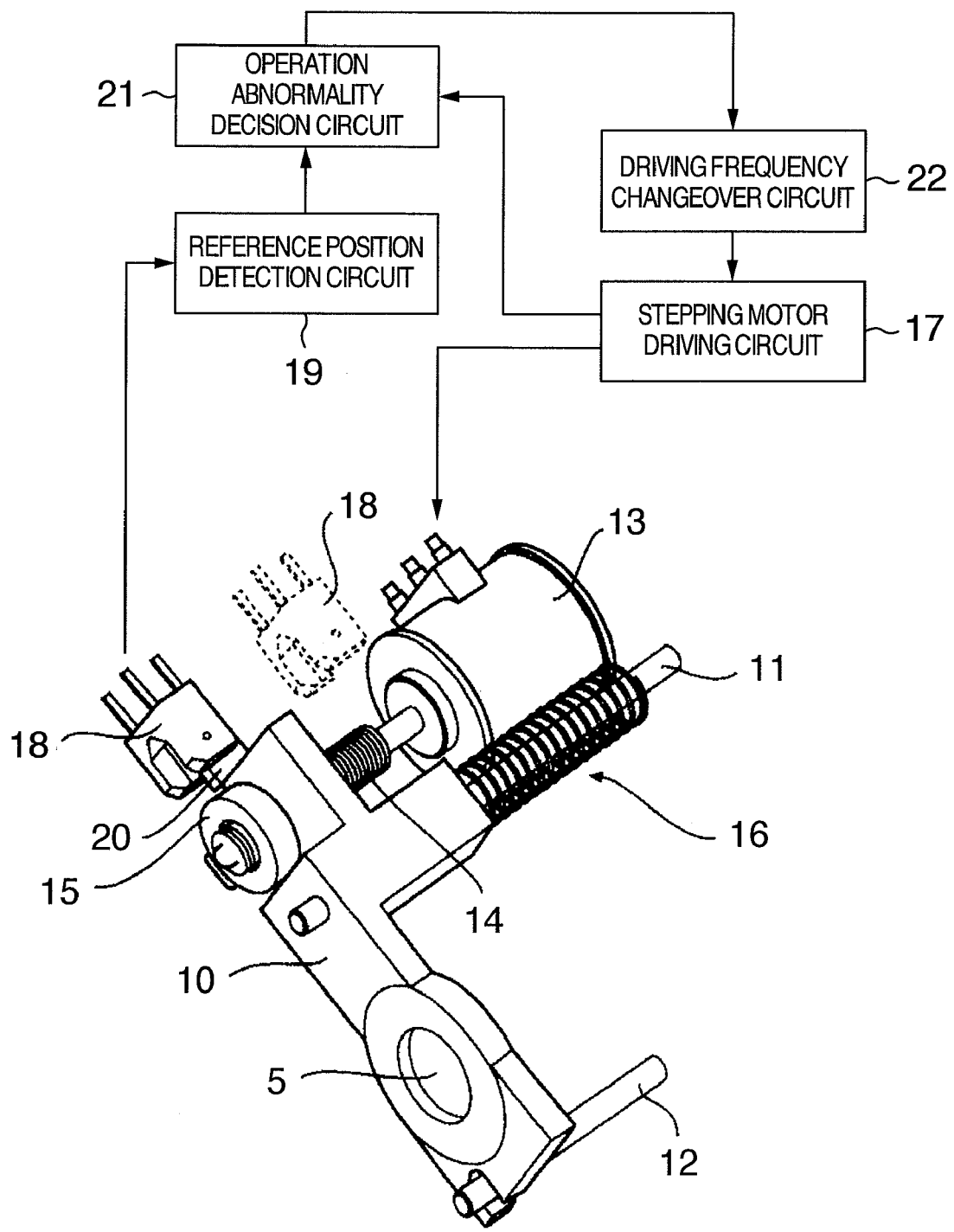
FIG. 1 is a diagram for explaining a configuration of a lens feeding device according to an embodiment of the present invention.

FIG. 1 is a diagram for explaining a configuration of a lens feeding device which moves and adjusts the movable lens 5.

A movable frame 10 having the movable lens 5 attached thereto is reciprocated in the optical axis direction under guidance of a main shaft 11 and a jack shaft 12 disposed in parallel to the optical axis direction of the laser light L shown in FIG. 2.

A lead screw 14 is attached to an output shaft of a stepping motor 13. A nut 15 having a baffle (not illustrated) is screwed into the lead screw 14. The lead screw 14 is disposed in parallel to the main shaft 11 and the jack shaft 12.

A part of the movable frame 10 is fitted to the lead screw 14 with play, and is elastically energized to the nut 15 side by a coil-shaped pressurizing spring 16 fitted to the main shaft 11 with play. Therefore, the movable frame 10 (the movable lens 5) is moved together with the nut 15 as the stepping motor 13 (the lead screw 14) is rotated.

The stepping motor 13 is driven so as to rotate by a stepping motor driving circuit 17 connected to the stepping motor 13. If the feeding pitch of the lead screw 14 is made small, minute feeding of the movable lens 5 is made possible. In the present embodiment, therefore, the feeding pitch of the lead screw 14 is made as small as 0.2 mm. The present embodiment has a configuration that the movable lens 5 can move by 10 μm in one step of the stepping motor 13 in order to correct the spherical aberration.

As the feeding pitch of the lead screw 14 becomes smaller, the minute feeding of the movable lens 5 becomes possible as described above. However, the driving force for moving the movable frame 10 also becomes large, and the biting force increases.

The biting of the stepping motor 13 refers to the following phenomenon: when the movable frame 10 collides with the nearby wall surface (not illustrated) and stops, the stepping motor 13 does not rotate even if it is attempted to rotate the stepping motor 13 in a direction opposite to the collision direction. When the movable frame 10 is in operation, it collides with the wall strongly due to energy and stops due to occurrence of biting. Even if the stepping motor 13 is rotated in the opposite direction, step-out occurs in the stepping motor 13 and the lead screw 14 does not rotate, and consequently the movable frame 10 becomes immobile.

This biting phenomenon is detected as described hereafter. A position detection sensor 18 is installed near an end part of a movable range of the movable frame 10, i.e., near a place where the movable frame 10 collides with the nearby wall surface.

In the present embodiment, the position detection sensor 18 represented by solid lines is installed near an end part of the lead screw 14 opposite to the stepping motor 13. In the case where the movable frame 10 collides with the wall surface near an end part of the lead screw 14 located on the stepping motor 13 side, however, the position detection sensor 18 is installed near the end part of the lead screw 14 located on the stepping motor 13 side as indicated by dotted lines. If there is a possibility that the movable frame 10 will collide near both end parts of the lead screw 14, the position detection sensor 18 is installed near each of the both end parts of the lead screw 14.

In the present embodiment, a photo-interrupter is used as the position detection sensor 18. A shading part 20 passes on an optical path which extends from a light emitting element to a light receiving element (neither of them is illustrated) of the position detection sensor 18. Since light is intercepted by the shading part 20, the output state of the position detection sensor 18 changes (changes from Low to High in the present embodiment). The signal change is input to the reference position detection circuit 19, and the movable frame 10 is judged to be in a reference position.

Figure 3:
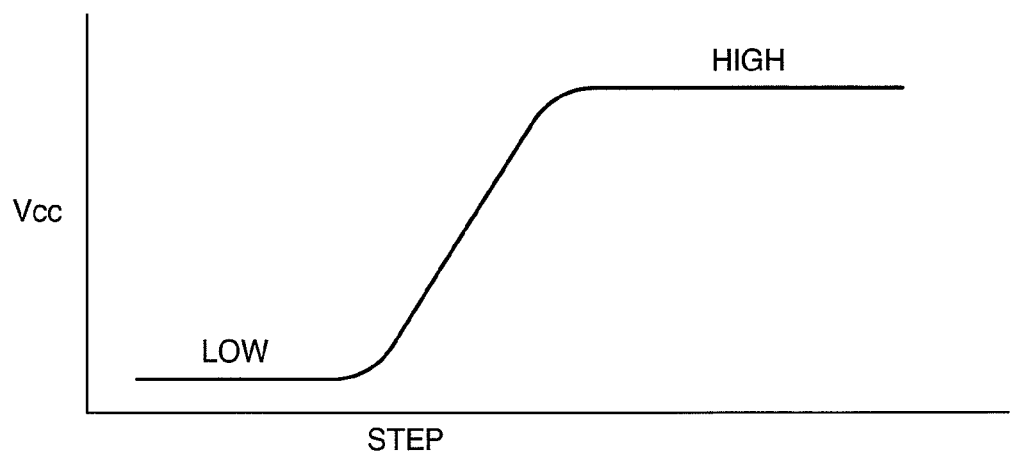
FIG. 3 is a diagram showing an output signal of a position detection sensor according to an embodiment of the present invention.

FIG. 3 is a diagram showing an output signal of the position detection sensor 18. In the present embodiment, a photo-interrupter is used as the position detection sensor 18. If light is intercepted, the signal output changes. In the present embodiment, a point exceeding a center value between High and Low is set as a zero point. The level changes from Low to High in approximately ten steps of the stepping motor 13. Since the movable frame 10 can move by 10 μm in one step of the stepping motor 13 as described earlier, the position can be detected sufficiently in the movement of 10 μm.

The stepping motor 13 is driven, and the movable frame 10 moves to, for example, the position shown in FIG. 1. The reference position detection circuit 19 detects that the movable frame 10 has arrived at the reference position on the basis of a change in the signal supplied from the position detection sensor 18. Taking the reference position as an operation original point, information recording/reproducing operation is conducted on, for example, the first recording layer in the Blu-ray Disc.

As described above, the spacing between the first recording layer and the second recording layer in the Blu-ray Disc is 25 μm. By changing the first recording layer over to the second recording layer, therefore, spherical aberration of 250 mλ occurs. In the present embodiment, a lens which can be corrected in spherical aberration of 10 mλ if the movable lens 5 is moved by 20 μm is used as the movable lens 5.

When the information recording/reproducing is changed from the first recording layer to the second recording layer, the stepping motor driving circuit 17 outputs a driving signal to the stepping motor 13 so as to rotate it by a predetermined number of steps in order to correct the spherical aberration. This driving signal is output to the operation abnormality decision circuit 21, which will be described later, as well.

In the normal case where the stepping motor 13 does not bite, the stepping motor 13 is rotated on the basis of the input driving signal, and the movable frame 10 moves. As a result, the shading part 20 gets out of the position detection sensor 18 and the output state of the position detection sensor 18 changes from High to Low. If the movable frame 10 (movable lens 5) moves as far as an indicated position, the movable frame 10 (movable lens 5) stops. Information recording/reproducing operation is conducted on the second recording layer in the position.

It is supposed that when the movable frame 10 is moved as far as the position shown in FIG. 1 a part of the movable frame 10 collides with the nearby wall surface and the stepping motor 13 bites due to the impact force as described earlier. Even if in this case the stepping motor driving circuit 17 outputs a driving signal to the stepping motor 13 so as to rotate it by a predetermined number of steps, the stepping motor 13 is not driven and the output state of the position detection sensor 18 remains High and it does not change. And a reference position detection signal remains output from the reference position detection circuit 19 to the operation abnormality decision circuit 21.

If the reference position detection signal is input to the operation abnormality decision circuit 21 although the driving signal from the stepping motor driving circuit 17 is input so as to rotate the stepping motor 13 by a predetermined number of steps, the operation abnormality decision circuit 21 judges that operation abnormality has occurred, i.e., biting (i.e., get-out) of the stepping motor 13 has occurred and the stepping motor 13 is not rotating.

Figure 4:
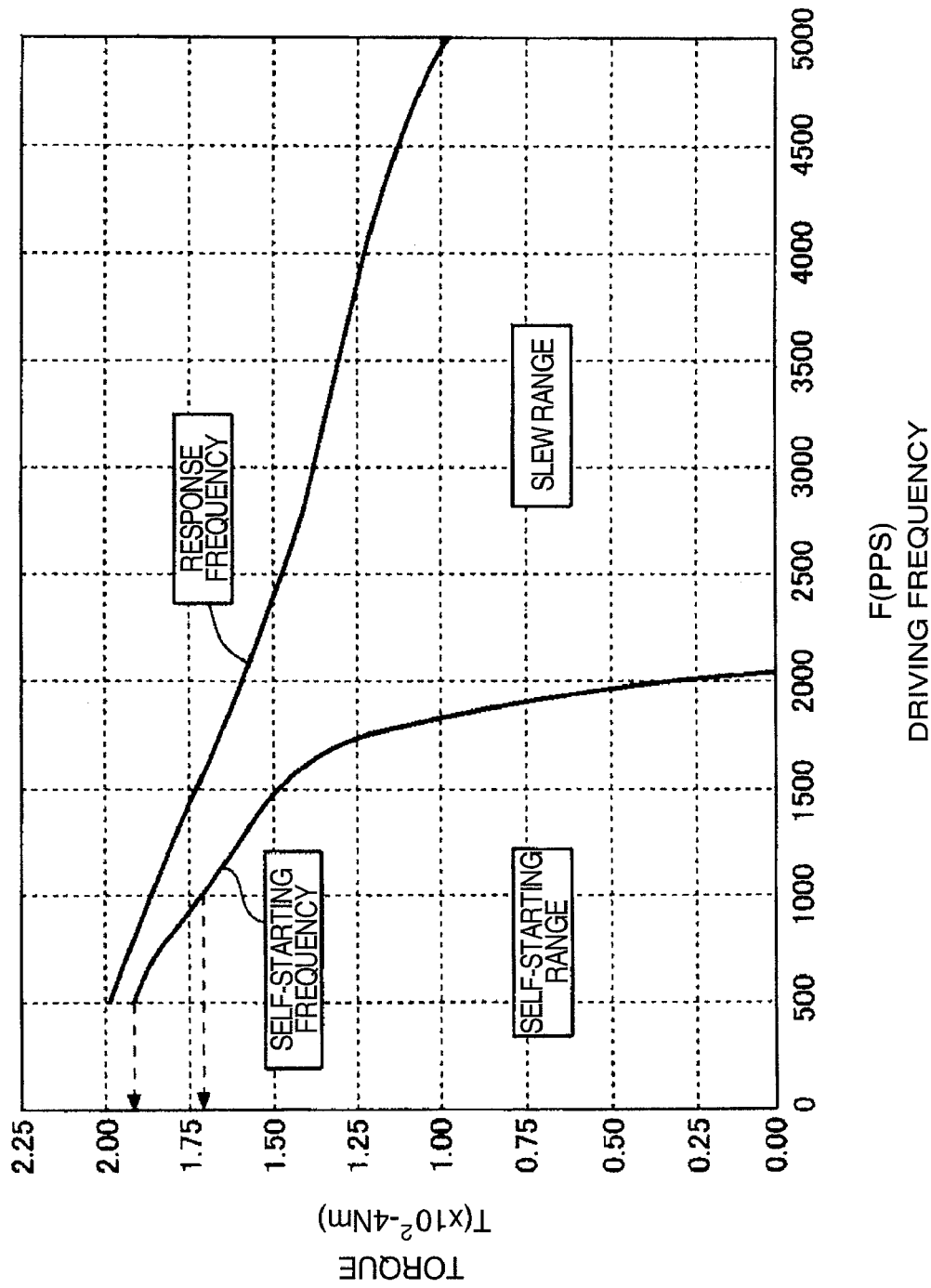
FIG. 4 is a diagram showing characteristic of constant voltage driving of a stepping motor according to an embodiment of the present invention.

FIG. 4 is a diagram showing characteristic of constant voltage driving of the stepping motor. A self-starting frequency curve is a curve showing relations between a driving frequency (F) and an output torque (T) of the stepping motor obtained when a driving signal is input in the standstill state of the stepping motor and the stepping motor begins to rotate. A slew range indicates a range in which the stepping motor tracks up to the frequency after the stepping motor is driven.

As indicated by the self-starting frequency curve, the constant-voltage driven stepping motor has a characteristic that the output torque of the stepping motor becomes larger as the driving frequency becomes low. The stepping motor 13 according to the present embodiment utilizes this characteristic.

At the time of ordinary movement operation of the movable frame 10, the driving frequency of the stepping motor 13 is set equal to a value in the range of 800 to 1200 pulses/second (PPS). In the present embodiment, the driving frequency is set to 1000 pulses/second (PPS). If an operation abnormality signal supplied from the operation abnormality decision circuit 21 is input to the driving frequency changeover circuit 22 (see FIG. 1), the driving frequency of the stepping motor 13 is changed over to a value in the range of 500 to 600 pulses/second (PPS). In the present embodiment, the driving frequency is set equal to 500 pulses/second (PPS).

As evident from the self-starting frequency curve shown in FIG. 4, the output torque of the stepping motor 13 is made large by lowering the driving frequency of the stepping motor 13 than that in the ordinary operation. In the case of the present embodiment, the driving frequency of the stepping motor 13 in the ordinary operation is 1000 PPS and the output torque of the stepping motor 13 at that time is approximately $1.70 \cdot 10^{-4}$ Nm. By lowering the driving frequency of the stepping motor 13 to 500 PPS, however, the output torque of the stepping motor 13 becomes approximately $1.92 \cdot 10^{-4}$ Nm and consequently the output torque increases to approximately 113% as compared with the time in the ordinary operation.

If the operation abnormality decision circuit 21 shown in FIG. 1 judges the operation to be abnormal, therefore, the operation abnormality decision circuit 21 outputs the operation abnormality signal to the driving frequency changeover circuit 22. On the basis of the operation abnormality signal, the driving frequency changeover circuit 22 supplies a changeover signal to the stepping motor driving circuit 17 to change over the driving frequency of the stepping motor 13 to a lower value.

And the stepping motor 13 is driven to rotate in a rotational direction opposite to that at the time of step-out with a lowered driving frequency (500 PPS in the present embodiment). An output torque larger than that at the time of step-out is thus obtained. As a result, the stepping motor 13 can get away from the biting state.

If the stepping motor 13 thus gets away from the biting state, then the movable frame 10 (the shading part 20) moves and a resultant change in the output state of the position detection sensor 18 is detected by the reference position detection circuit 19. A signal of this detection is sent to the operation abnormality decision circuit 21, and the stepping motor 13 is judged to have got away from the biting state. On the basis of it, the operation abnormality decision circuit 21 outputs an operation abnormality cancel signal to the driving frequency changeover circuit 22. The driving frequency changeover circuit 22 changes over the driving frequency of the stepping motor 13 to that at the time of the ordinary operation (1000 PPS in the present embodiment) on the basis of the cancel signal, and the ordinary operation is restored.

Figure 5:
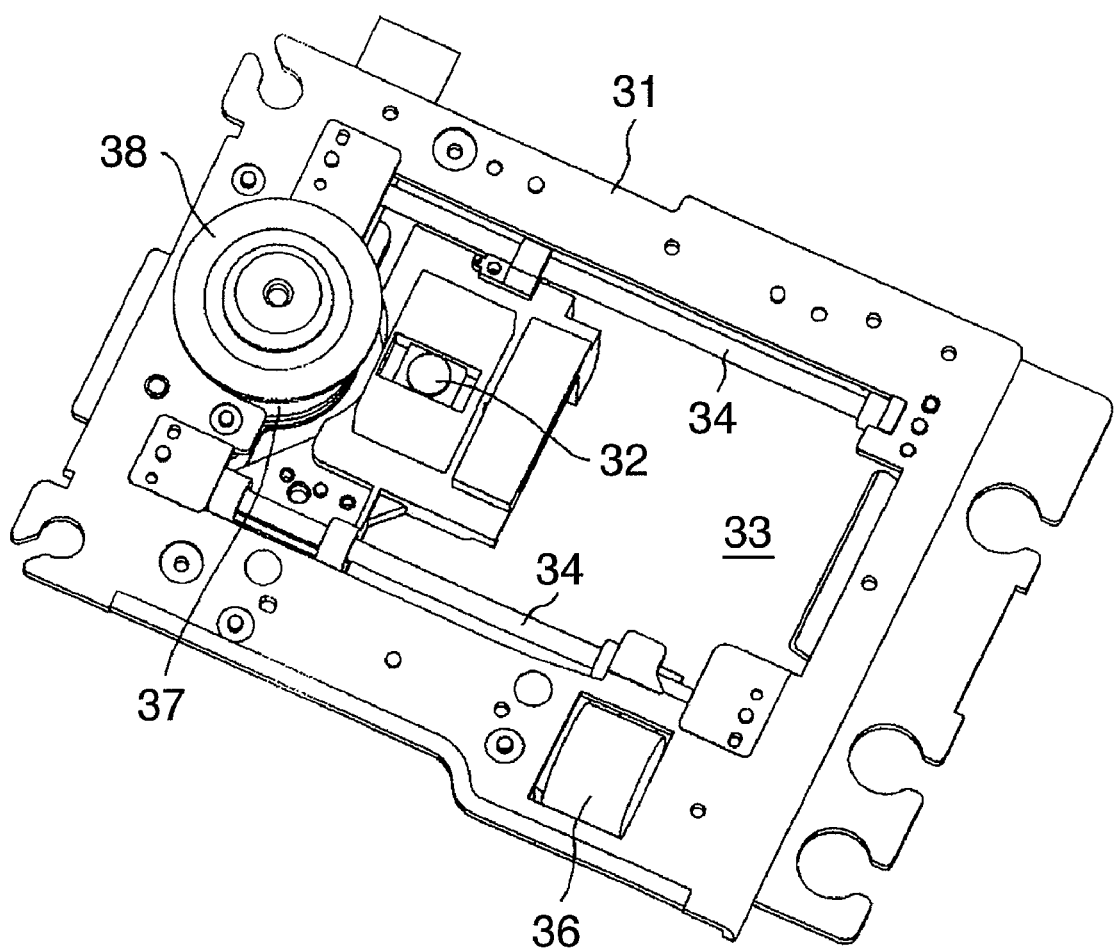
FIG. 5 is an oblique view of an optical disk apparatus according to another embodiment of the present invention obtained when it is viewed from the above.
Figure 6:
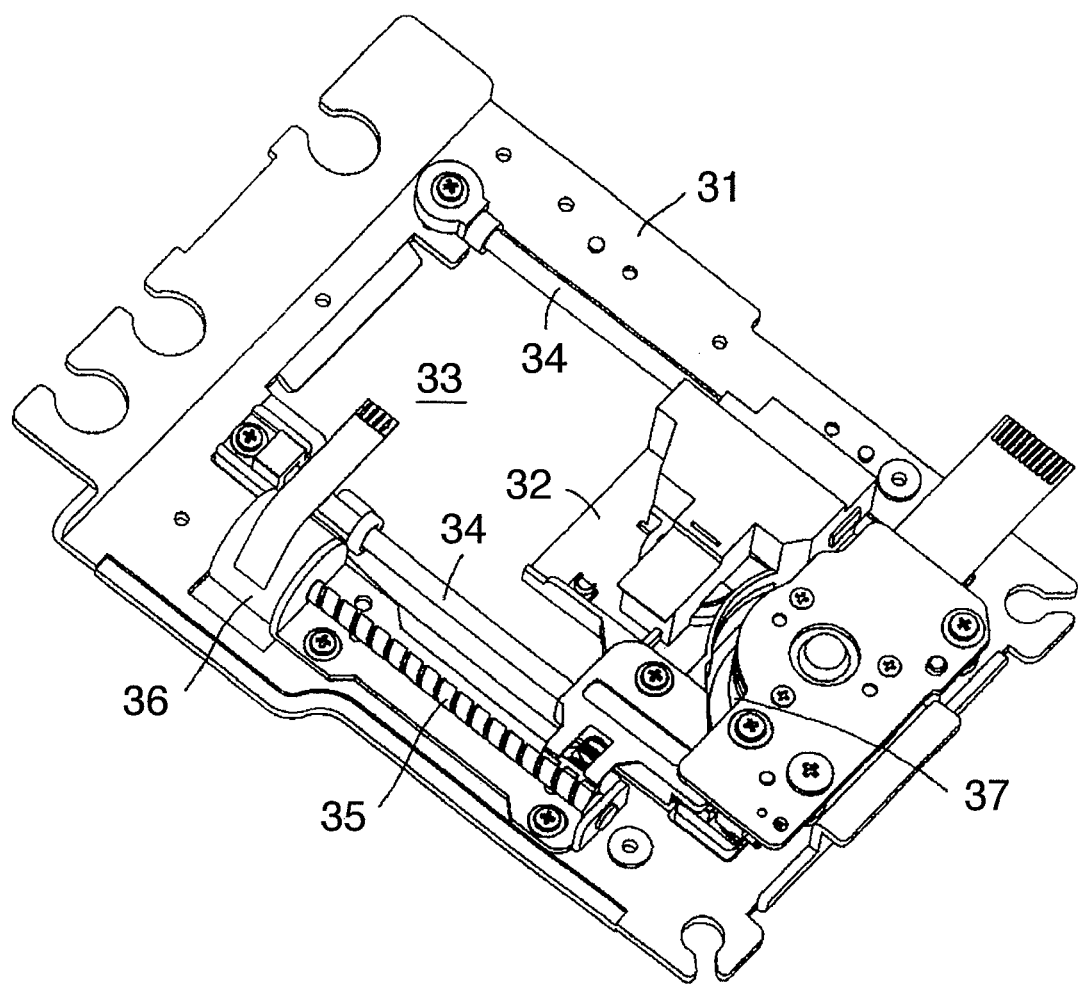
FIG. 6 is an oblique view of the optical disk apparatus obtained when it is viewed from the below.

In the embodiment, the lens feeding device for moving the lens has been described. However, FIGS. 5 and 6 show an example of an optical disk device which moves the whole optical pickup. FIG. 5 is an oblique view of the optical disk apparatus obtained when it is viewed from the above, and FIG. 6 is an oblique view of the optical disk apparatus obtained when it is viewed from the below.

Reference numeral 31 in FIGS. 5 and 6 denotes a chassis. An opening part 33 which allows a reciprocating motion of an optical pickup 32 is formed in the chassis 31. An ordinary optical pickup 32 having an object lens mounted thereon is disposed in the opening part 33. Two guide shafts 34 for guiding the reciprocating motion of the optical pickup 32 are fixed to the chassis 31.

As shown in FIG. 6, a lead screw 35 is disposed in parallel to one of the guide shafts 34. A base end part of the lead screw 35 is coupled to a stepping motor 36. A spherical member or a convex member provided on the optical pickup 32 side gears with a screw groove of the lead screw 35. The optical pickup 32 conducts a reciprocating motion according to the rotation of the lead screw 35 caused by the stepping motor 36. A reference position of the optical pickup 32 is detected by a position detection sensor (not illustrated) such as a microswitch attached to the chassis 31.

A spindle motor 37 is fixed to the chassis 31. A turntable 38 for rotating an optical disk (not illustrated) is fixed to a rotation axis of the spindle motor 37.

In the optical disk apparatus having such a configuration, it is necessary to move the optical pickup 32 fast especially in the early stage of start. Therefore, the stepping motor 36 is rotated fast. At this time, it is possible that a part of the optical pickup 32 collides with another member and step-out is caused in the stepping motor 36 by the impact force.

In order to detect step-out of the stepping motor 36 and dissolve the step-out in the present embodiment, a position detection sensor (not illustrated) detects that the optical pickup 32 has arrived at the reference position as a result of the rotation of the stepping motor 36. If there is no change in an output state of the position detection sensor when the rotation direction of the stepping motor 36 is inverted, then it is judged that step-out is occurring in the stepping motor 36 and the driving frequency of the stepping motor 36 is lowered to approximately half as compared with that at the time of ordinary operation. As a result, the output torque of the stepping motor 36 is increased and the step-out of the stepping motor 36 can be dissolved.

An optical disk apparatus according to the present invention can also be configured so as to always drive a stepping motor with a low frequency when starting the driving and then drive the stepping motor with an ordinary driving frequency. Since the stepping motor can be driven in a high driving force state by driving the stepping motor with a low frequency, it is possible to drive the stepping motor stably under a load variation. It is desirable to set the driving speed equal to approximately half of the ordinary speed.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An optical disk apparatus for conducting recording or reproducing on an optical disk, the optical disk apparatus comprising:

an optical element feeding device comprising a support member for supporting an optical element provided to correct spherical aberration so as to be capable of moving the optical element in an optical axis direction, a force applying member for applying force to the support member in the optical axis direction, a reference position detection part for detecting a reference position of the optical element, a stepping motor supplied with a definite voltage and driven, a motive force transmission member for converting rotation of the stepping motor into the optical axis direction and transmitting the converted rotation to the optical element;

a driving circuit for driving the stepping motor;

a decision circuit for judging operation to be abnormal when there is no change in an output of the reference position detection part even if the driving circuit outputs a driving signal to the stepping motor after the reference position detection part has detected the reference position of the optical element; and a changeover circuit for changing over a driving frequency so as to drive the stepping motor with a driving frequency lowered than a frequency in ordinary operation, on the basis of an operation abnormality signal output from the decision circuit.

2. The optical disk apparatus according to claim 1, wherein when the changeover circuit drives the stepping motor with a low driving frequency and the output of the reference position detection part has changed, the decision circuit judges the stepping motor to have got away from the abnormal operation and the changeover circuit changes over the of the stepping motor from the low driving frequency to the frequency in ordinary operation.

3. An optical disk apparatus for conducting recording or reproducing on an optical disk, the optical disk apparatus comprising:

an optical element feeding device comprising a support member for supporting an optical element provided to correct spherical aberration so as to be capable of moving the optical element in an optical axis direction, a reference position detection part for detecting a reference position of the optical element, a stepping motor supplied with a definite voltage and driven, and a motive force transmission member for converting rotation of the stepping motor into the optical axis direction and transmitting the converted rotation to the optical element;

a driving circuit for driving the stepping motor so as to move the optical element in a definite range from the reference position detected by the reference position detection part;

a decision circuit for judging operation to be abnormal when there is no change in an output of the reference position detection part even if the driving circuit outputs a driving signal to the stepping motor after the reference position detection part has detected the reference position of the optical element; and a changeover circuit for changing over a driving frequency so as to drive the stepping motor with a driving frequency lowered than a frequency in ordinary operation on the basis of an operation abnormality signal output from the decision circuit.

4. The optical disk apparatus according to claim 3, wherein the optical element feeding device further comprises a force applying member for applying force to the support member in the optical axis direction.

5. The optical disk apparatus according to claim 3, wherein the driving circuit changes over the driving frequency so as to make the driving frequency at driving start of the stepping motor lower than the driving frequency in ordinary operation.

6. An optical disk apparatus for conducting recording or reproducing on an optical disk, the optical disk apparatus comprising:

an optical element feeding device comprising a support member for supporting an optical element provided to correct spherical aberration so as to be capable of moving the optical element in an optical axis direction, a reference position detection part for detecting a reference position of the optical element, a stepping motor supplied with a definite voltage and driven, and a motive force transmission member for converting rotation of the stepping motor into the optical axis direction and transmitting the converted rotation to the optical element; and a driving circuit for driving the stepping motor so as to move the optical element in a definite range from the reference position detected by the reference position detection part, wherein the driving circuit changes over the driving frequency so as to make the driving frequency at driving start of the stepping motor lower than the driving frequency in ordinary operation.

7. An optical disk apparatus for conducting recording or reproducing on an optical disk, the optical disk apparatus comprising:

an optical element feeding device comprising a support member for supporting an optical element provided to correct spherical aberration so as to be capable of moving the optical element in an optical axis direction, a force applying member for applying force to the support member in the optical axis direction, a reference position detection part for detecting a reference position of the optical element, a stepping motor supplied with a definite voltage and driven, a motive force transmission member for converting rotation of the stepping motor into the optical axis direction and transmitting the converted rotation to the optical element; and a driving circuit for driving the stepping motor so as to move the optical element in a definite range from the reference position detected by the reference position detection part, wherein when the optical element cannot be moved in the optical axis direction even if the stepping motor is driven with a first driving frequency, the driving circuit drives the stepping motor with a second driving frequency lower than the first driving frequency.

8. A driving method for an optical element feeding device which moves an optical element in an optical axis direction to correct spherical aberration, wherein the optical element feeding device comprises:

a support member for supporting an optical element provided to correct spherical aberration so as to be capable of moving the optical element in an optical axis direction;

a force applying member for applying force to the support member in the optical axis direction;

a reference position detection part for detecting a reference position of the optical element;

a stepping motor supplied with a definite voltage and driven; and a motive force transmission member for converting rotation of the stepping motor into the optical axis direction and transmitting the converted rotation to the optical element, and the driving method comprises the steps of:

outputting a driving signal to the stepping motor;

outputting an operation abnormality signal indicating operation abnormality when a reference position signal indicating a reference position detected by the reference position detection part does not change; and changing over a driving frequency on the basis so as to drive the stepping motor with a driving frequency lowered than a frequency in ordinary operation, on the basis of the operation abnormality signal.

* * * * *